United States Patent [19]

Douty

[11] Patent Number: 4,516,884
[45] Date of Patent: May 14, 1985

[54] GROUTING COMPOSITION CARTRIDGE

[75] Inventor: Donald L. Douty, Franklin Township, Westmoreland County, Pa.

[73] Assignee: United States Steel Corporation, Pittsburgh, Pa.

[21] Appl. No.: 528,381

[22] Filed: Sep. 1, 1983

[51] Int. Cl.$^3$ .............................................. E21D 20/02
[52] U.S. Cl. .................................... 405/261; 206/219; 206/568
[58] Field of Search ....................... 405/261, 260, 258; 206/219, 220, 568

[56] References Cited

U.S. PATENT DOCUMENTS

| | | | |
|---|---|---|---|
| 4,007,831 | 2/1977 | Bernhardt | 405/261 X |
| 4,096,944 | 1/1978 | Simpson | 206/219 |
| 4,227,612 | 10/1980 | Dillon | 405/261 X |
| 4,253,566 | 3/1981 | Seemann | 206/220 |
| 4,273,689 | 6/1981 | Smearing | 260/22 |
| 4,279,340 | 7/1981 | Lang | 405/261 X |
| 4,326,890 | 4/1982 | Benichou | 106/77 |
| 4,338,048 | 7/1982 | Murphy et al. | 405/261 |
| 4,345,686 | 8/1982 | Sato et al. | 206/219 |
| 4,378,997 | 4/1983 | Kasama et al. | 106/89 |

Primary Examiner—Dennis L. Taylor
Attorney, Agent, or Firm—W. Gary Goodson

[57] ABSTRACT

An improved hardenable inorganic grouting composition cartridge comprising: (1) cartridge filler ingredients comprising, (a) a dry inorganic cement powder, and (b) liquid containing capsules, and wherein the liquid is reactive with the inorganic cement, and wherein the capsules are pressure sensitive and capable of being progressively ruptured by the force of the anchor element, (2) an elongated flexible tubular casing containing the filler ingredients, and (3) a reinforcing member, preferably a flexible one, which adds lengthwise rigidity to the cartridge casing.

The grouting composition cartridge of this invention is injected into a hole in a support structure. An anchor element is then introduced into the hole containing the grouting composition cartridge. The grouting composition is released from the casing thereby forming a hardened grout around the anchor element.

This invention also includes methods of manufacture and usage of the improved cartridge.

10 Claims, 5 Drawing Figures

GROUTING COMPOSITION CARTRIDGE

FIELD OF THE INVENTION

This invention relates to an improved grouting composition cartridge for an anchor element, the cartridge comprising (1) cartridge filler ingredient comprising (a) pressure sensitive liquid containing microcapsule particles, and (b) non-pressure sensitive hydraulic cement powder particles, and (2) an elongated tubular casing containing the filler ingredients. This invention also includes methods of manufacture and usage of the improved cartridge.

BACKGROUND OF THE INVENTION

Considerable effort has gone into developing means for anchoring roof bolts as part of an effort to prevent roof collapses in mines. Obviously, there are many other applications that require grouting of an anchor element in a hole of support structure.

The common commercial anchor element cartridge in use today comprises reactive components of a resin with the components in separate compartments of an elongated tubular casing which are brought into contact with one another upon injecting a bolt.

The reaction of the reactive components of the resin can cause serious health hazards to those people who have to work in the mines.

Therefore, efforts have been made to produce anchor element cartridges which would provide effective fastening for the anchor element in a hole of a support structure and not cause harmful side effects of toxicity or sensitization of allergy-prone persons. One such successful solution to this problem is disclosed in U.S. Pat. No. 4,096,944, incorporated herein by reference, wherein an anchor element cartridge is described comprising water-containing microcapsules which are pressure sensitive combined with non-pressure sensitive hydraulic cement powder. When an anchor element is injected into the elongated cartridge which is in an elongated bore hole in the roof of a mine, the pressure from the anchor element causes a reaction to take place between the hydraulic cement powder and the water which is released from the pressure sensitive microcapsules. These cartridges do an effective job of anchoring without the harmful effects of the resin cartridges. These hydraulic cement cartridges also, at present, have potential ecomomic advantages over resin cartridges due to less expensive material and/or manufacturing costs.

However, a major problem that has arisen with respect to the hydraulic cement cartridges is the difficulty of insertion of the cartridge into the hole in the mine roof. Also related to this are problems of lack of consistent cartridge quality, which has resulted in some poor bonds of the roof bolt to the mine roof.

These problems appear to be related to the problems of manufacture wherein the cartridge filler ingredients are not mixed uniformly in the final cartridge, the final cartridge has weakness planes, and in general there is a lack of uniform compaction of the ingredients in the final cartridge. The final cartridges then have a "rope-like" quality that makes it very difficult to insert, for example, in a small hole in a mine roof. Workers would like to be able to insert the cartridges into the hole with one hand. Instead they have difficulties with both hands. Also the difficulties of getting the cartridge in the hole can cause work delays due to damage caused to cartridges in getting them into the hole, then having to remove the damaged cartridge, and start over with a new cartridge. The damaged cartridge also results in expensive waste of materials. This can result in lost time during installation, as well as cartridges that are damaged during installation thus requiring replacement, or cartridges that only go part way into the hole.

An additional problem which appears to have contributed to inconsistent bonding of the roof bolt is the fact that during insertion of the metal roof bolt the tubular casing often jams the hole in accordian fashion, or alternatively acts as a cover to the inside of the hole in the mine ceiling therefore preventing contact, and bonding, between the reacted cartridge ingredients and the wall of the hole.

The net result of these problems is that any economic advantages that the hydraulic cement cartridges have over the commonly used resin cartridges are significantly diminished or lost. Furthermore, operator resistance to utilizing such difficult to install cartridges would likely be an insurmountable barrier to their general usage, even if there were some economic and ecological advantages to their usage.

SUMMARY OF THE INVENTION

This invention relates to an improved grouting system for use in an elongated hole of a support structure in combination with an anchor element wherein a hardened grout is formed around the reinforcing member in the hole by the reaction of at least two mixed components of a hardenable inorganic grouting composition, thereby anchoring the reinforcing member in the hole, the components being adapted to be forced into an annulus formed between the anchor element and the wall of the hole by the introduction of the reinforcing member into the composition before any substantial hardening of the composition has occurred, and comprising an inorganic grouting composition cartridge comprising (1) cartridge filler ingredients comprising, (a) dry inorganic cement powder and, (b) liquid containing capsules, and wherein the liquid is reactive with the inorganic cement, and wherein the capsules are pressure sensitive and capable of being progressively ruptured by the force of the anchor element, and (2) an elongated flexible tubular casing containing the filler ingredients, and the improvement wherein the composition additionally comprises a reinforcing member, preferably a flexible one, which adds lengthwise rigidity to said cartridge. Preferably, the flexible reinforcing member comprises a semi-rigid, elongated member attached to the casing preferably on the outside and running in a direction substantially parallel to the casing.

The invention also includes methods of manufacture and usage of the improved cartridge.

This invention not only improves the rigidity of the cartridge, thereby overcoming the installation problems, but also results in improved consistency of quality of the uniformity of mixing and compaction of the cartridge ingredients. Weakness planes, poor composition, and non-uniform mixing problems relating to the cement can be significantly diminished or eliminated using this invention. The reinforcing member causes rapid compaction with a shorter vibration cycle and less intense vibrations being required. Another significant benefit is that the presence of the reinforcing member results in enhanced shredding of the elongated tubular casing upon insertion of the anchor element in the hole containing the cartridge. This results in the elimination of reduction of the aforementioned problems caused by the tubular casing jamming up the hole, or covering the wall and thereby preventing bonding of the reacted cartridge ingredients with the wall surface.

A further benefit of the use of the reinforcing member of this invention is that the tubular casing can be made of thinner and/or less expensive materials thus further enhancing the economic benefits of this invention.

The net result of this invention is to produce a cartridge which is much more easily installed and therefore has improved worker acceptance, and also results in a much improved consistent bonding of the anchor element to the support system. To these advantages are added (1) time savings due to more rapid cartridge manufacture and more rapid cartridge installation and (2) potential material savings due to lower tubular casing costs.

DESCRIPTION OF THE PREFERRED EMBODIMENTS

Figure 1:
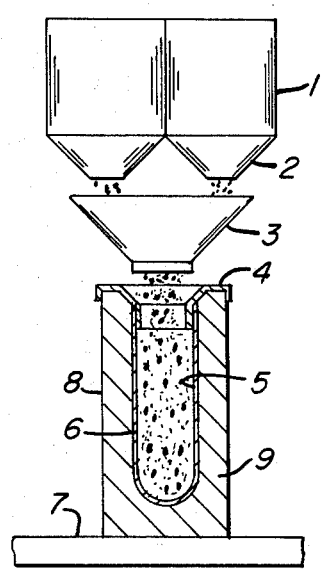
FIG. 1 is a representation of a preferred apparatus for manufacturing cartridges containing the grouting composition of this invention.

The flexible tubular casing is preferably a thin casing having sufficient dimensional stability and strength to be able to contain the cartridge ingredients without substantial relaxation, but which is readily destroyed upon insertion of the anchor element in the support structure. Preferred materials are any of the plastic films suitable for this type packaging, such as polyethylene, polypropylene, and polyester. Materials such as the polyolefins which are not readily flammable, and yet can be heat sealed are most preferred. Polyethylene film having a thickness between about 0.002 and about 0.004 inches is especially preferred.

The reinforcing member of this invention is one which adds lengthwise rigidity to the cartridge casing in order to improve cartridge compaction of the cartridge ingredients in the casing during the cartridge manufacture, and which enhances shredding of the cartridge casing upon insertion of the anchor element into the hole of the support structure. Preferably the reinforcing member is preferably flexible and one that can be readily permanently attached to the casing in casing manufacture. A preferred member is a semi-rigid plastic strip, such as one made out of polyester or polypropylene. This reinforcing member is a semi-rigid member having a rigidity that will retain the elastic properties of the sleeve material upon cartridge flexure in normal handling during installation into an elongated hole in a support structure.

The reinforcing member is a long, thin member running parallel and fixedly attached to the cartridge casing. The reinforcing member is preferably made as part of the film which forms the casing. However, it can also be a separate strip which is adhesively bonded to the casing. In one embodiment this reinforcing member is a plastic strip which is adhesively bonded to the casing by hot melt procedures. Also adhesives to bond the reinforcing member to the casing, or any other art recognized method of attachment may be utilized.

The reinforcing member may be slightly shorter than the filled cartridge. For example, a 45-inch casing might have a 43-inch reinforcing strip fixedly attached to the side of the casing, with one inch at the top and the bottom of the cartridge without casing. However, in the preferred embodiment the reinforcing strip goes the full length of the casing and forms part of the bond when sealing the bottom of the casing.

Preferably the anchor element is a rigid bolt, preferably with ribs or threads which upon insertion of the element in the hole of the support structure will tear up the casing. Preferably a metal bolt is inserted in a screwing or rotating motion in order to enhance the destruction of the casing.

It is important that the lengthened diameter of the anchor element cartridge and anchor element be in proper relation to the length and diameter of the hole for which the particular anchor element is intended in order to accomplish the desired objectives of this invention. For example, a one-inch diameter hole in a mine roof will preferably use a cartridge having a diameter between about 0.8 and about 0.95 inch, with an 0.91 inch diameter being most preferred, and a roof bolt having a diameter between about 0.65 and about 0.875, with a 0.75 inch being preferred.

The pressure sensitive capsule particles of this invention contain liquid and the non-pressure sensitive particles contain inorganic cement powder. These are the principle ingredients of the filler for the cartridge of this invention. Chemicals for accelerating hardening and increasing strength may be added in amounts generally not exceeding about 3% of the weight of the cement powder. The inorganic cement powder is preferably hydraulic cement powder of the type that will harden when contacted with water or similar liquid. Suitable types of hydraulic cement include portland, pozzolan, gypsum plaster, magnesium oxychloride and magnesium oxysulfate. The cement is generally used without any filler such as sand in order to form a stronger, faster hardening material.

The capsules containing the liquid are preferably spherical in shape. However, they may be elongated, threadlike, etc. They comprise an outer shell of an insoluble, frangible material which is pressure sensitive and which contains a small amount of liquid. The capsules are preferably microcapsules varying in size from about 400 to about 5000 microns in diameter. The most preferred diameter of such microcapsules is between about 1000 and about 2400 microns. The capsules serve to keep the liquid separate from the cement powder until the capsules are broken by application of pressure.

The liquid used in the capsules is preferably water or other liquid that will react with inorganic cement to form a hardened mass capable of fastening an anchor element in a hole of a support structure. Preferably, the hardened mass is such that would be suitable for roof bolts in mines such as coal mines.

A lubricant component for the grouting composition of this invention is preferably utilized in such form and amount to allow the inorganic cement powder to flow as free flowing solids. Preferably, this lubricant is also a wetting agent for the cement powder. A silicone lubricant is particularly preferred. Most preferred is a silicone fluid having a viscosity between about 300 cps and about 1,000 cps.

FIG. 1 of this invention discloses a preferred apparatus for manufacturing cartridges using the grouting composition of this invention, comprising a double hopper arrangement 1, preferably containing a separate auger feed in each hopper, wherein one of the hoppers is for the pressure sensitive containing microcapsule particles and the other hopper is for the non-pressure sensitive hydraulic cement particles. The double hopper 1 comprises means for transporting the particles from each hopper into a common receptacle in the form of a funnel-shaped bottom of the hopper 2. The common receptacle means 3 is preferably in the form of a funnel and comprises means for mixing the particles without causing rupture of a substantial portion of the pressure sensitive liquid-containing particles. This means for mixing can be the inclined sides of the funnel or, preferably, rotating horizontal discs with each disc being located under the point where the different particles come to the common receptacle means 3. The mixing means can also be blasts of air or other gaseous material, or other such means. The mixed particles then drop into filling means 4, preferably in the form of a funnel, for filling a first vertically elongated flexible tubular casing 5 having a reinforcing member 6 fixedly attached thereto. The apparatus also contains means for positioning the tubular casing 5 in filling position relative to the filling means 4. This means for positioning can also include a vibrating means for vibrating the tubular casing during the filling step to consistently produce a packed tubular casing having mixed particles of an effective uniformity of density for use in fastening an anchor element in a hole in a support structure. The means for positioning and vibrating means may include a movable support 7 to move the tubular casing into position in a vertically elongated rigid frame 8, which preferably is in the form of a rigid tube with a closed bottom 9. The elongated tubular casing 5 also preferably has a closed bottom. This casing is preferably made of plastic film such as polyolefin which is inexpensive and easily ruptured by insertion of the anchor element.

The bottom of the filling means 4 is preferably attached to the top of the tubular casing 5 and the bottom of the tubular casing 5 rests on a support means such as movable support 7 or the bottom 9 of the vertically elongated rigid frame 8.

The movable support means 7, when vibrating during the filling operation, then transfers its vibrations to the vertically elongated tubular casing during the filling operation to obtain the desired end product. This apparatus is thus able to produce a high-quality product very rapidly. It also lends itself well to automation, the use of multiple filling arrangements for the elongated casings.

Figure 2:
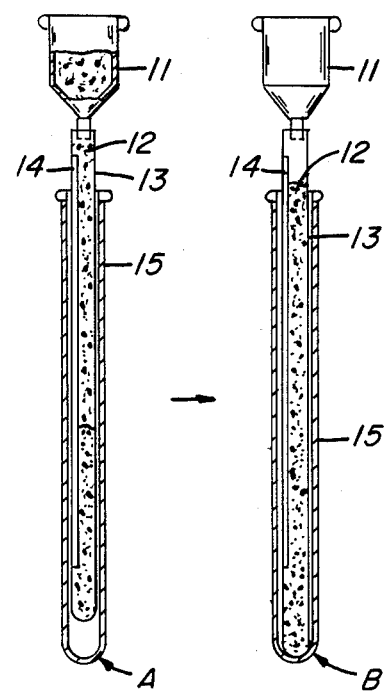
FIG. 2 is a representation of the vibration compaction steps of the method of manufacture of this invention.

Part A of FIG. 2 shows the initial vibration compaction portion of the process for making the cartridges of this invention. Vibrating funnel 11 containing the cartridge filler ingredients of this invention are being funnelled into the connected elongated flexible casing 13 such that vibrations from the funnel 11 are transferred to the casing 13 and its filler ingredients 12. Reinforcing member 14 is fixedly bonded to the outside of casing 13 to provide lengthwise rigidity to the casing 13. The casing 13 is encased in vertically elongated rigid frame 15. Part B of FIG. 2 shows the final vibration compaction portion of the process wherein the casing 13 is disengaged from funnel 11, and wherein vibration is transferred to the filled casing 13 from the bottom of rigid frame 15. The vibration is preferably an up and down movement of sufficient intensity to rapidly compact the cartridge filler ingredients 12 without substantially breaking the pressure sensitive capsule component of the filler ingredients 12.

Figure 3:
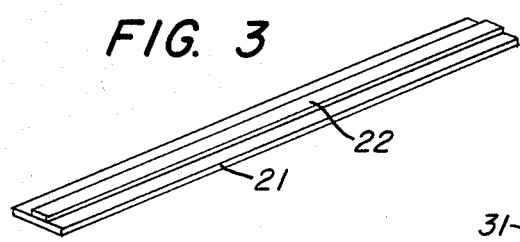
FIG. 3 is a representation of a preferred elongated flexible casing having an attached reinforcing member fixedly attached to the casing.

FIG. 3 shows an unfilled elongated tubular casing 21 having a heat seal to close off one end, and having reinforcing member 23 fixedly attached thereto to provide lengthwise rigidity for a majority, and preferably almost all of the length of the casing 21.

Figure 4:
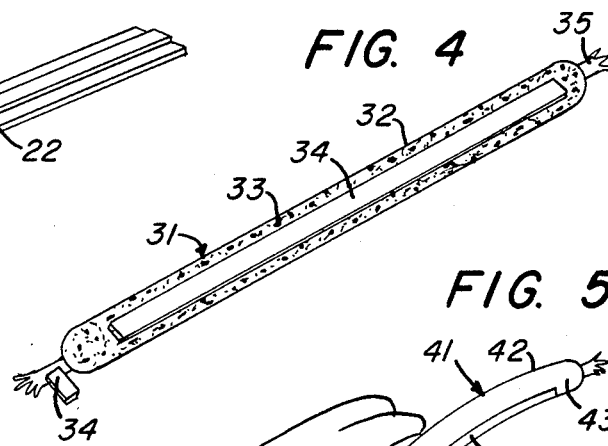
FIG. 4 is a representation of a filled cartridge made up of the cartridge filler ingredients, the flexible casing, and the reinforcing member.

FIG. 4 shows a completed cartridge 31 according to this invention made up of the elongated casing 32, compactly filled with filler ingredients according to this invention, having reinforcing member 34 fixedly attached thereto, and having sealed ends 34 to prevent loss of filler ingredients 33.

Figure 5:
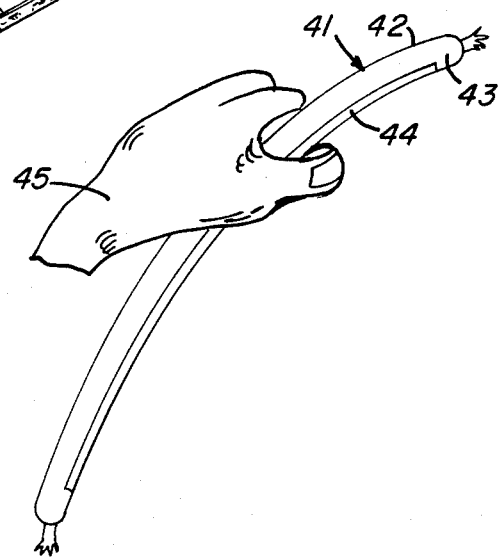
FIG. 5 is a representation of a filled cartridge being man-handled for insertion into a hole in a support structure.

FIG. 5 shows completed cartridge 41 according to this invention, comprising elongated casing 42, filler ingredients 43, and reinforcing member 44 as described above which is being man-handled as indicated by human hand 45. FIG. 5 is attempting to show that the cartridge 41 has sufficient rigidity to be readily inserted in a small hole in a mine roof by only using one hand. This frees up the workman's other hand for holding equipment or other purposes.

EXAMPLE

Using the apparatus of FIG. 1, two parts by weight of the hydraulic cement particles (of alpha-type gypsum cement having an average particle size of 0.074 mm or 0.0017 inches) are mixed with one part of water-containing microcapsules having an average water payload of 0.625 percent and an average diameter of 2400 microns and wherein the capsules are made according to the method for mass-producing capsules outlined in U.S. Pat. No. 3,389,194, incorporated herein by reference. High-quality cartridges are produced according to this method at a production rate of twenty-five (four-foot equivalent length, 45 inches actual length, and 0.91 inches diameter) cartridges per minute with a dispensing accuracy of $\pm 2$ grams or 1.3 percent. This compares to the prior art Chub-style machine and independent vibrator system production rate of 8 cartridges per minute with a dispensing tolerance of $\pm 7$ grams or 4.7 percent.

A cement-enhancing silicone fluid having a viscosity of 350 cps and sold under the trade name Dow Corning 200 Fluid is used to lubricate the cement particles and gives greater compaction of the cement and water microcapsule mixture. The amount of water microcapsules is also reduced by about 8% by using the lubricant. The cartridge of additive-enhanced cement is 20.5 inches long and has a polypropylene strip reinforcing member 43 inches long, ½ inch wide, and 0.025 inch thick which is hot melt bonded to the outside of the casing and so positioned to leave about one inch on the top and bottom of the casing which does not have any reinforcing member.

When filling the tubular casing with the mixed ingredients of this invention using the apparatus of FIG. 1, it is preferred to vibrate the casing at a rate such that little product separation takes place, the cartridges are firm and easily handled, and localized hardening is avoided. Also, it is important that the tubular casing has a soft bottom so that rupture of the water capsules is avoided during the filling and vibrating step. Higher percentages of silicone additive in the cement also slightly shortened the vibration time period. Excessive vibration during filling caused local hardening in the cartridge whereas, for example, this local hardening was eliminated by vibrating the tubular casing during filling at 250 cycles per minute for 35 seconds while replacing the metal clip at the bottom of the casing with a heat seal to provide a softer bottom of the cartridge.

A preferred mixture for the cartridge of this invention in one series of tests was determined to contain 2.0 percent (by weight) silicone and 1.5 percent potassium sulfate (accelerator) mixed at 0.29 water microcapsule to cement weight ratio based upon the shortest hardening time when inserting the anchor element and the best workability of any mix tested.

These cartridges produced using the apparatus of FIG. 1 were readily inserted in the hole of the support structure using one hand. The anchor element was inserted in the hole in a screwing motion, and after hardening of the grout produced an anchor element which had excellent adhesion to the walls of the hole of the support structure, as is indicated by a pull test.

The reinforcing member of this invention preferably increases the stiffness index of the cartridge of this invention by a factor or 2 or more and more preferably by a factor between 6 and 10. The stiffness index referred to is that given by the test exemplified below.

Two cartridges prepared (one with a reinforcing strip and one without) as indicated in the example provided hereinabove, but having the following specifications:

| | |
|---|---|
| Diameter | 0.935 inch |
| Length | 45 inches |
| Weight | 520 gms. |
| Water-to-cement (W/C) ratio | 0.29 |
| Alpha-type gypsum cement | 355 gms. |
| Water microcapsules (2400 micron average diameter) | 165 gms. |
| Water microcapsule payload (av.) | 62½% |
| Casing thickness (polyethylene film containing EVA additive to provide elasticity) | 0.002 inch |
| Reinforcement strip | ½ × 0.025 inch |

The two cartridges are placed in a horizontal resting position on a supporting horizontal flat surface with six inches of each cartridge extending over the edge of the supporting horizontal flat surface. The reinforced cartridge had the reinforcing strip on the bottom side of the casing. The vertical deflections of the projecting ends of the cartridges projecting over the edge of the supporting surface are measured. 0.25 inches verticle deflection is measured for the reinforced cartridge and 1.5 inches verticle deflection is measured for the unreinforced cartridge. Thus the stiffness index of the reinforced cartridge is six times greater than that of the unreinforced cartridge.

I claim:

1. A cartridge for grouting an anchor element in an elongated hole of a support structure, comprising (1) an elongated tubular casing fabricated of a frangible material capable of being punctured and shredded by an anchor element thrust into said cartridge and having a diameter between enclosed ends sufficient to enable said cartridge to be introduced into said hole; (2) a substantially homogeneous mixture of cartridge filler ingredients comprising (a) a dry hydraulic cement powder, and (b) water-containing capsules substantially uniformly dispersed in said cement powder that fills the interior of said tubular casing between said enclosed ends; and (3) a flexible reinforcing member fixedly attached to said tubular casing to thereby add lengthwise rigidity to said casing; and wherein said capsules have inert, frangible shells enclosing droplets of water, and wherein said capsules are pressure sensitive and are capable of being progressively ruptured by the force of said anchor element being thrust into said cartridge when said cartridge is positioned in said hole to thereby dispense the water substantially uniformly throughout said cement powder to enable said water and said cement powder to thoroughly interact to form a flowable cement paste in contact with the hole wall and said anchor element, which when solidified forms a grout about said anchor element to secure said anchor element to said support structure.

2. A grouting cartridge as defined in claim 1 wherein said flexible reinforcing member comprises a semi-rigid, elongated member running in a direction substantially parallel to said elongated casing, and wherein said reinforcing member increases the stiffness index of the filled cartridge casing by at least a factor of 2.

3. System as in claim 2 wherein said semi-rigid, elongated member comprises a plastic strip manufactured as part of said casing.

4. System as in claim 2 wherein said semi-rigid member has a rigidity that will retain the elastic properties of the sleeve material upon cartridge flexure in normal handling during installation into said hole in said support structure.

5. A grouting cartridge as defined in claim 1 wherein said capsules have diameters in a range of between about 400 and about 5000 microns.

6. A grouting cartridge as defined in claim 1 wherein said mixture comprises 1 part water to between about 3 and about 5 parts of said cement powder by weight.

7. A grouting cartridge as in claim 1 wherein said mixture comprises one part water to about 4 parts gypsum cement powder by weight.

8. A grouting cartridge as defined in claim 1 wherein said capsules are sufficiently frangible to be ruptured en masse upon the application of a pressure of between 10 and 600 grams force.

9. A grouting cartridge as defined in claim 1 wherein said capsules contain an aqueous solution of a chemical accelerator for accelerating the hardening of said cement powder when said capsules are ruptured.

10. A grouting cartridge as in claim 1 wherein said cement powder is Portland cement powder.

* * * * *

UNITED STATES PATENT AND TRADEMARK OFFICE
CERTIFICATE OF CORRECTION

PATENT NO. : 4,516,884
DATED : May 14, 1985
INVENTOR(S) : Donald L. Douty

It is certified that error appears in the above-identified patent and that said Letters Patent is hereby corrected as shown below:

Column 1, line 25, after "bolt," insert -- thereby forming a hardened resin which anchors the bolt into the base. --

Signed and Sealed this

Twenty-fourth Day of December 1985

[SEAL]

Attest:

DONALD J. QUIGG

Attesting Officer

Commissioner of Patents and Trademarks